(12) United States Patent
Ho

(10) Patent No.: US 7,847,519 B2
(45) Date of Patent: Dec. 7, 2010

(54) SMART BATTERY PROTECTOR WITH IMPEDANCE COMPENSATION

(75) Inventor: Chang-Yu Ho, Cyong-Lin Township, Hsinchu County (TW)

(73) Assignee: Neotec Semiconductor Ltd., Chu-Pei, Hsin-Chu Hsien (TW)

( * ) Notice: Subject to any disclaimer, the term of this patent is extended or adjusted under 35 U.S.C. 154(b) by 166 days.

(21) Appl. No.: 12/149,907

(22) Filed: May 9, 2008

(65) Prior Publication Data
US 2009/0278501 A1    Nov. 12, 2009

(51) Int. Cl.
*H02J 7/00* (2006.01)
(52) U.S. Cl. ...................................... 320/134; 320/163
(58) Field of Classification Search ................. 320/134, 320/163
See application file for complete search history.

(56) References Cited

U.S. PATENT DOCUMENTS

| | | | | |
|---|---|---|---|---|
| 5,554,919 A | * | 9/1996 | Uchida | 320/132 |
| 5,789,902 A | * | 8/1998 | Abe et al. | 320/134 |
| 5,990,663 A | * | 11/1999 | Mukainakano | 320/134 |
| 6,194,975 B1 | * | 2/2001 | Leizerovich et al. | 331/117 R |
| 7,498,769 B1 | * | 3/2009 | Potanin et al. | 320/125 |

* cited by examiner

*Primary Examiner*—Edward Tso
*Assistant Examiner*—Ramy Ramadan
(74) *Attorney, Agent, or Firm*—Birch, Stewart, Kolasch & Birch, LLP

(57) ABSTRACT

A battery protector with internal impedance compensation comprises: a logic circuit and delay module, an overcharge comparator, and an over-discharge comparator. The overcharge comparator has a positive terminal connected with a first adjustable reference signal and the over-discharge comparator has a negative terminal connected with a second adjustable reference signal and both of the other terminals of comparator are fed by the same partial voltage of the same voltage divider, which has two terminals, respectively, connected with the two electrodes of the battery. The first adjustable reference signal and the second adjustable reference are varied with the charging current or discharging current and the internal impedance of the battery.

12 Claims, 10 Drawing Sheets

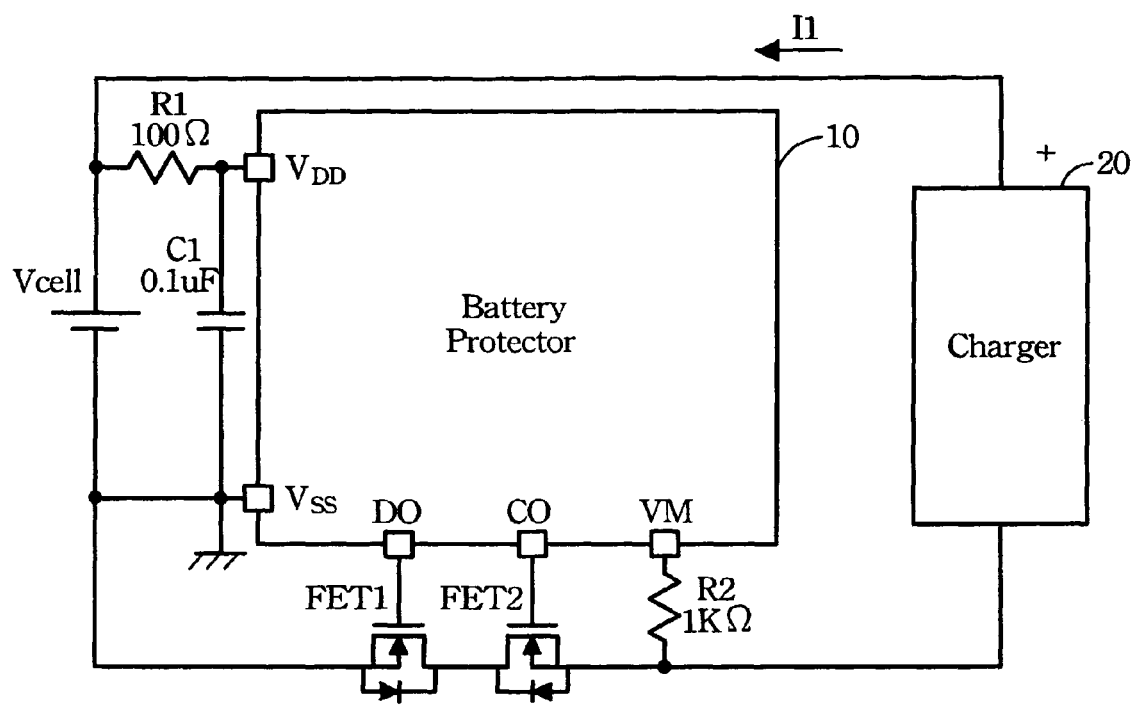
F I G. 1 c

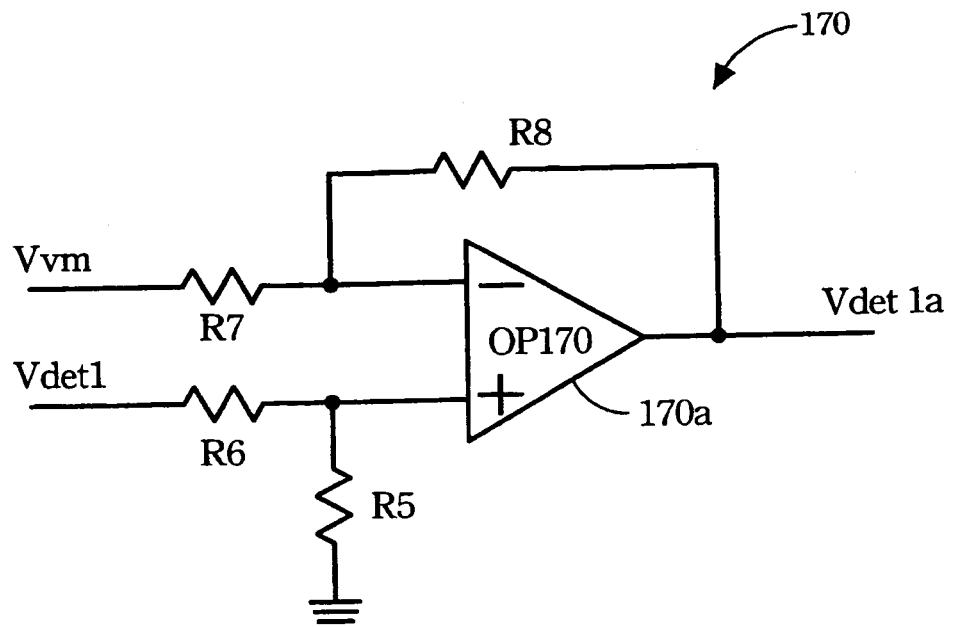
F I G . 3 a
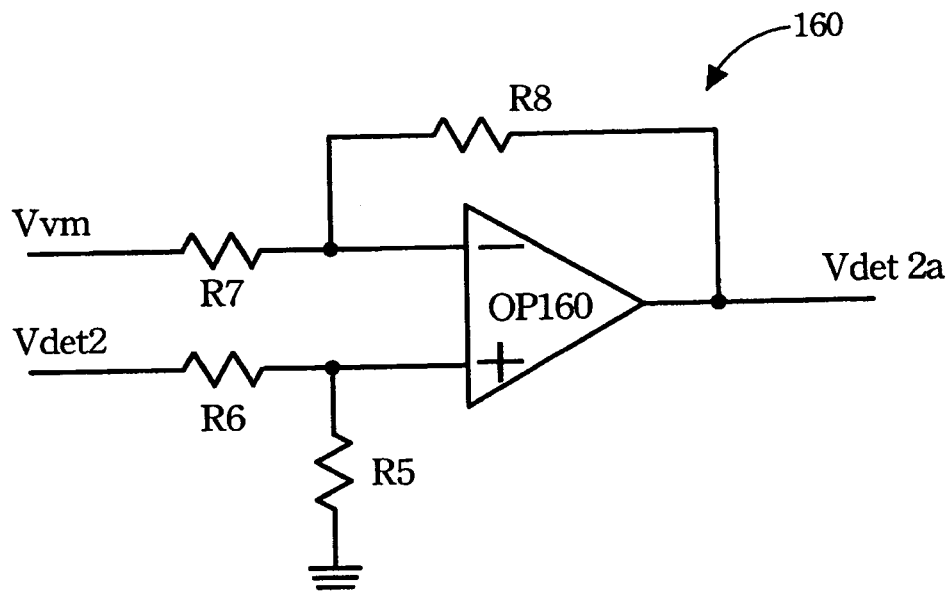
F I G . 3 b

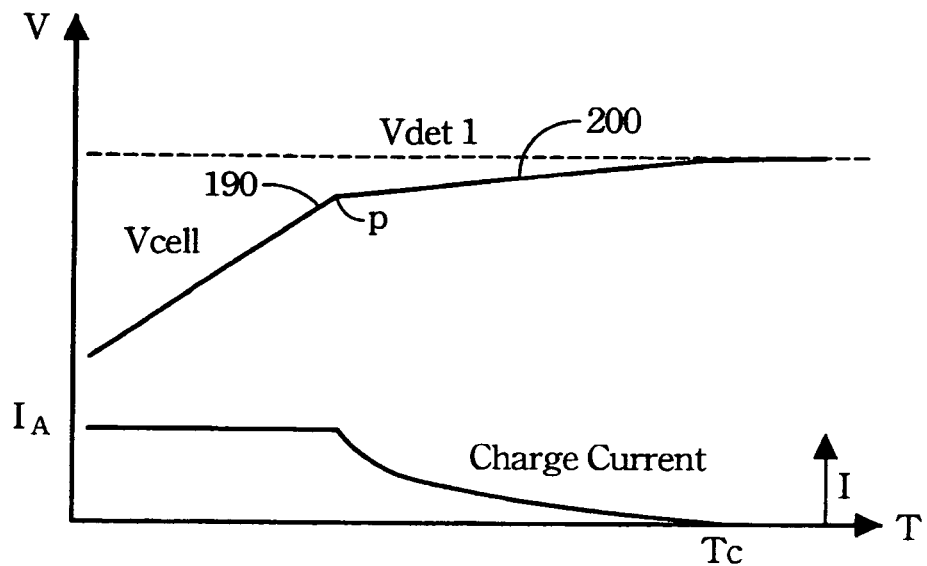
F I G . 4 a
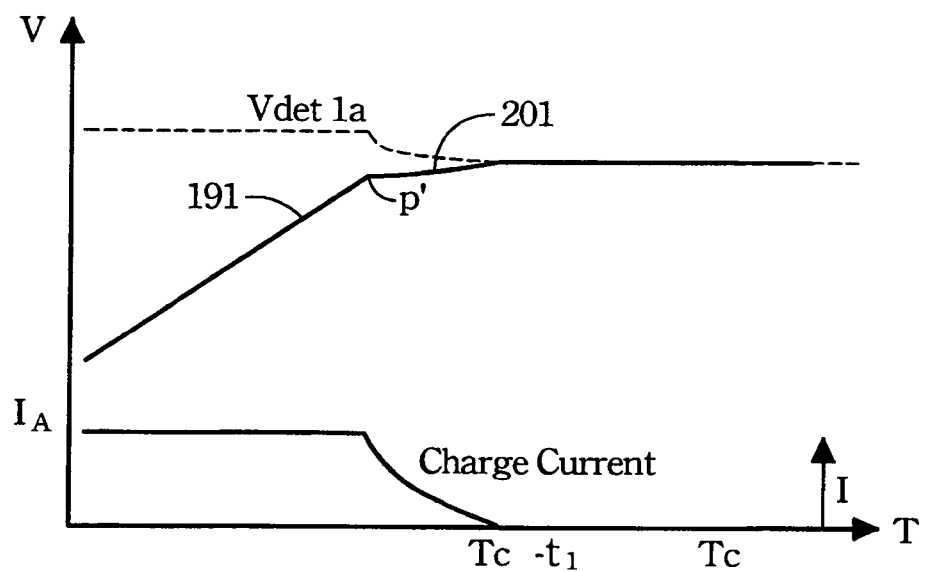
F I G . 4 b

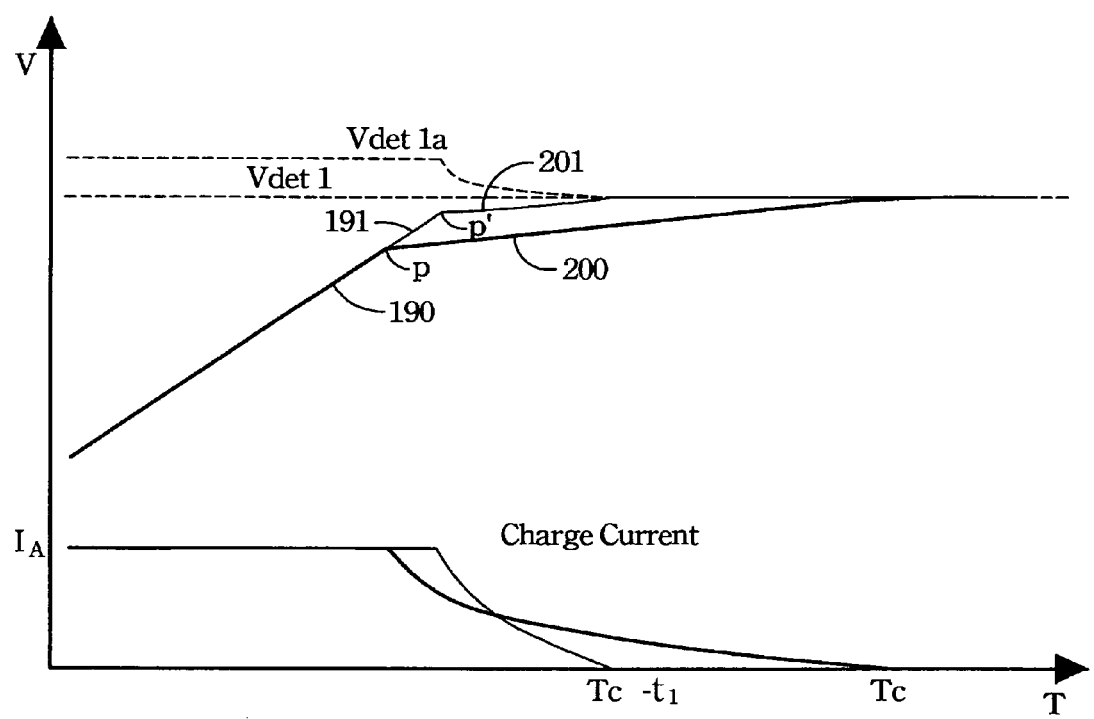
F I G . 4c

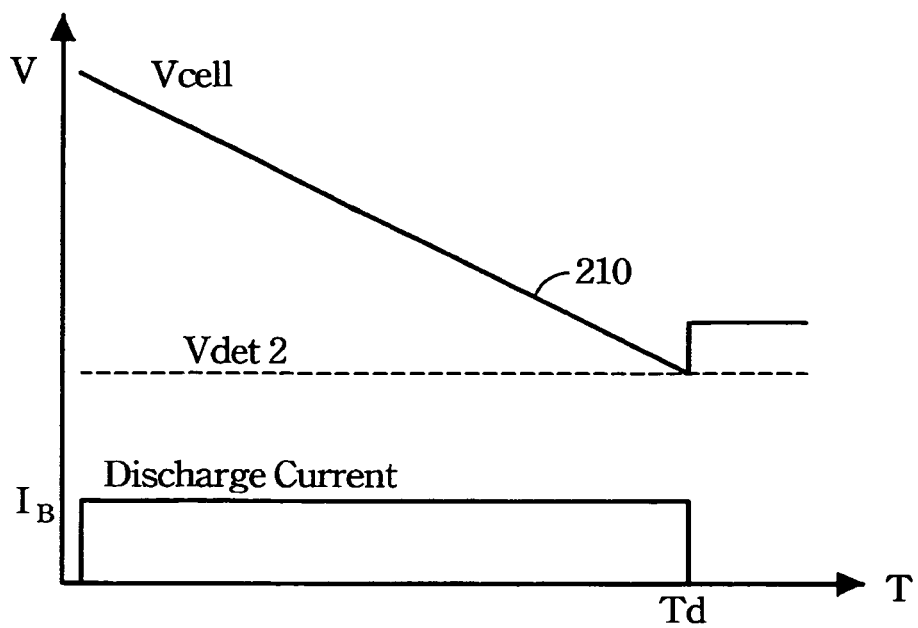
F I G . 5 a
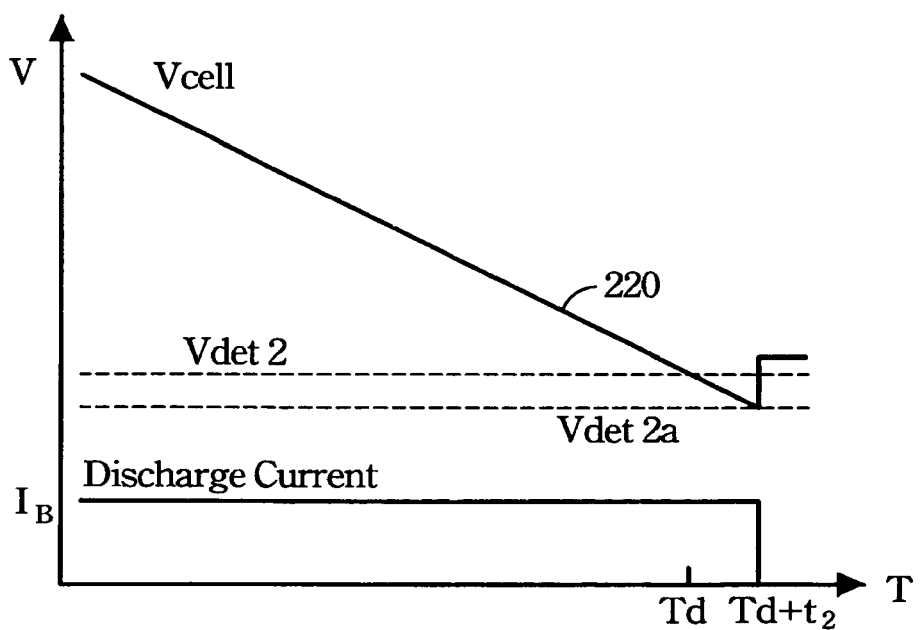
F I G . 5 b

SMART BATTERY PROTECTOR WITH IMPEDANCE COMPENSATION

FIELD OF THE INVENTION

The present invention is related to a battery protector, particularly, to a protector having impedance compensation of the battery so as to save total charging time and provide users more battery capacity for their probable electric devices.

DESCRIPTION OF THE PRIOR ART

Battery is knows as a main power for most of probable electric devices. For instance, the mobile phone, Notebook, PDA (personal digital assistance), Walkman, etc., all are relied on the battery to provide their power. The battery, however, saves only limited electrical capacity. As a probable device is turned on, the charges saved in the battery consumed will sustain until power off or the residue electrical capacity is not enough to support the probable device work properly. As the electricity saved in the battery is lower than a critical level, the battery will need to be discarded or recharged. Generally, for the earth environment and the average cost for a long time are concerned, choosing the rechargeable battery as the main power will be the best policy. A typical rechargeable battery can be recharged to replenish its electricity up to several hundreds to thundered times while a better battery protector or/and battery management system is/and used.

The most popular types of rechargeable battery in the market are found to be Ni-MH battery and Li-ion battery due to the least memory effect properties thereof while charging the battery. The battery protector protects the battery cell when the battery cell is over-charged or the battery cell is over-discharged so as to extend the life time of the battery. The over-charge detection is to sense the battery voltage and check if the voltage is higher than a first internal threshold $V_{det1}$. The over-discharge detection is to sense the battery voltage and check if the voltage is lower than a second internal threshold $V_{det2}$.

Referring to FIG. 1a and 1b, function blocks internal a battery protector 10 according to prior art are shown. In FIG. 1a, a overcharge comparator 50 and a over-discharge comparator 55 used the first internal threshold Vdet1, and Vdet2 as reference voltages, respectively. The current flows from the pin $V_{DD}$ through the resistors R1 and R2 of the voltage divider to the pin $V_{SS}$. The terminal voltage of the resistor R2 as base line of detected terminal voltage of the battery cell.

Referring to FIG. 1c, it showing a charger 20 is charging to the battery cell, which has a voltage $V_{cell}$ of a battery under control of a battery protector 10 and at that time, the protector 10 sustain turns on FET 2, an external MOSFET connected to the pin CO of the protector 10, until the over-charge event occurrence. In the situation of over-charge, the $V_{cell}$ is higher than the first internal threshold Vdet1, the FET 2 will be turned off. On the other hand, the protector 10 turn on FET 1, an external MOSFET connected to the pin DO of the protector 10 while the battery cell $V_{cell}$ is discharging to an external loading until an occurrence of over discharge. As the battery cell voltage $V_{cell}$ is lower than an internal threshold $V_{det2}$, the protector 10 will turn off the FET 1.

However, the voltage $V_{cell}$ of the battery cell measured does not truly reflect the true voltage of the battery cell $V_{bat}$. The fact is that the battery cell contains an internal impedance $R_{bat}$. And the measured cell voltage $V_{cell}=V_{bat}+I1*R_{bat}$ where $V_{bat}$ is a true voltage of the battery cell.

Typically, the battery impedance $R_{bat}$ is about 100 mΩ. As a result, as a true battery cell voltage=4.1V, the voltage measured will be $V_{cell}$=4.2V for charging current $I_1$=1 A, and $V_{cell}$=4.0V for discharging current I1=−1 A.

As forgoing descriptions, if a design engineer does not take the internal impedance of the battery into account while designing a battery protector and put it as a reference while setting the battery internal threshold Vdet1, Vaet2, the problems of undercharging or overcharging may occur. However, the voltage affected by the internal impedance of the battery depends on the discharging or charging current, it is thus using constant Vdet1, Vdet2Vdet1, Vdet2 would resulted in turning off the FET2 too early or turning off the FET1 by the battery protector 10 too late. The problems are necessary to be corrected so as to protect the battery. A typical solution is two phases 190, 200 charging, fast and slow rate charging rate during the phase I 190 and II 200, as shown in FIG. 4A.

An object of the present invention thus is to propose a smart battery protector having impedance compensation so as to save the charge time and extended the life time of the battery.

SUMMARY OF THE INVENTION

A battery protector with battery internal impedance compensation is disclosed. The battery protector comprises: a logic circuit and delay module, an overcharge comparator, and an over-discharge comparator. The overcharge comparator has a positive terminal connected with a first adjustable reference signal and the over-discharge comparator has a negative terminal connected with a second adjustable reference signal and both of the other terminals of comparator are fed by the same partial voltage of the same voltage divider, which has two terminals, respectively, connected with the two electrodes of the battery. The first adjustable reference signal and the second adjustable reference are varied with the charging current or discharging current and the internal impedance of the battery. The logic circuit and delay module generates response signals to turn on/off the external transistors so as to allow the charger to charge the battery or terminate the battery outputting energy.

In another embodiment, most of the function blocks are the same as former embodiment except two voltage dividers instead of one and one adjust reference signal instead of two are set in the battery protector.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1c showing a battery is charged by a charger under control of the battery protector.

FIG. 3a shows a first reference signal adjustable generator according to the present invention.

FIG. 3b shows a second reference signal adjustable generator according to the present invention.

FIG. 4a shows charging curves under control of the battery protector according to prior art.

FIG. 4b shows charging curves under control of the battery protector according to the present invention.

FIG. 4c shows the charging curves according to prior art and the present invention.

FIG. 5a shows discharging curves under control of the battery protector according to prior art.

FIG. 5b shows discharging curves under control of the battery protector according to the present invention.

DESCRIPTION OF THE PREFERRED EMBODIMENT

As aforementioned descriptions in the background of the present invention, the measured voltage of the battery $V_{cell}$ is not a true value since an internal impedance is existed in a battery so that the measured voltage differs from the true battery voltage by 100 mV as charging current or discharging current is 1 A. Hence it is necessary to compensate the internal impedance of the battery while charging or discharging the battery for a good battery protector.

The charging or discharging current can be detected through the pin VM of the protector. The voltage $V_{VM}$ on the pin VM is: $V_{VM}=-I_1$ (the charging current)*$R_{MOS}$.

Where $R_{MOS}$ is the sum of internal resistances of field effect transistors FET2 and FET1, each of which is about 25 mΩ so $R_{MOS}$ is about 50 mΩ typically. Thus if the internal impedance of a battery cell is 100 mΩ then the following formula can be derived the true voltage of the battery cell Vbat:

$$V_{bat}=V_{cell}-0.1*I_1=V_{cell}-2*(0.05*I_1)=V_{cell}+2*V_{VM}.$$

The above formula is established on the assumption that the internal impedance of the battery is double of $R_{MOS}$. Thus, a generic formula of the relationship formula would be:

$$V_{bat}=V_{cell}+K*V_{VM}, \text{ where K is a ratio of } R_{bat}/R_{MOS}$$

Figure 1A:
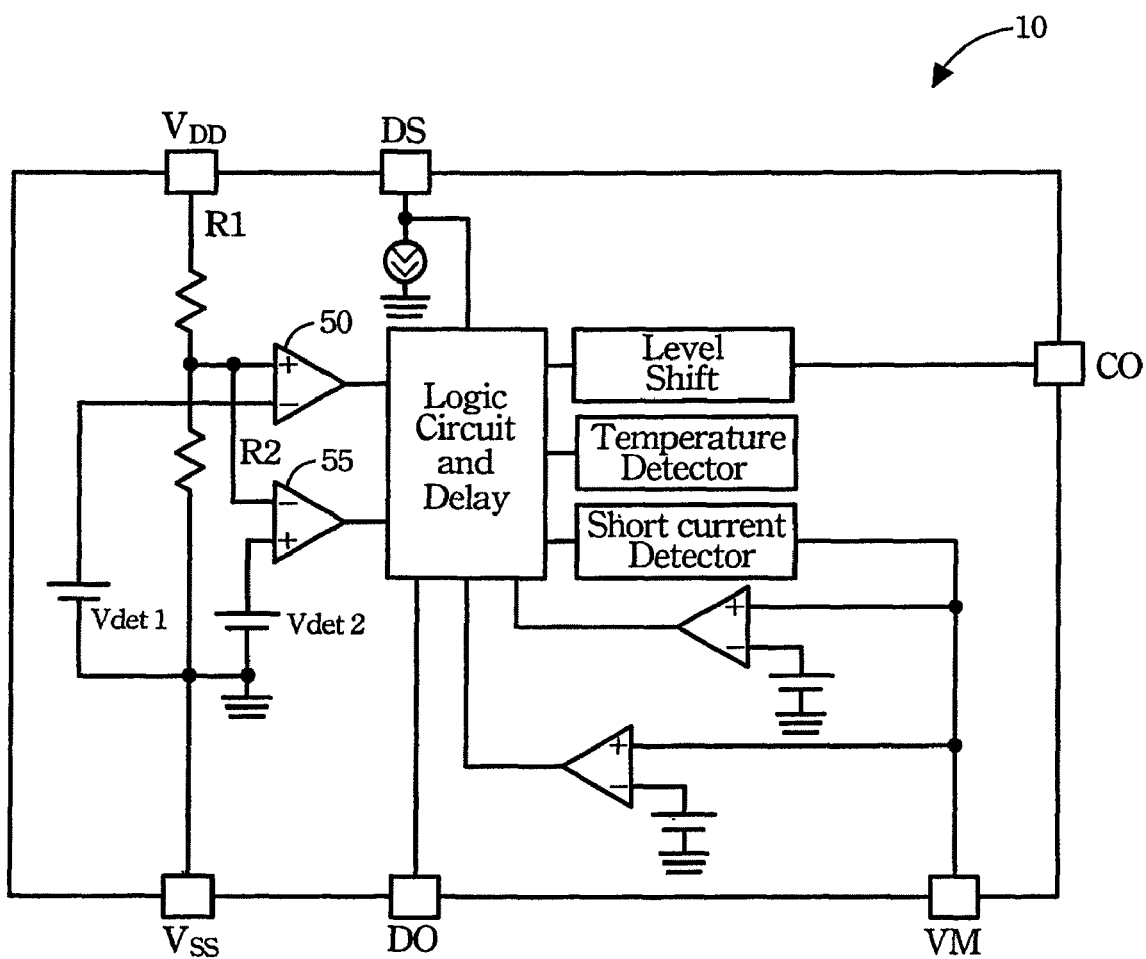
FIG. 1a shows function blocks in a battery protector according to a first preferred embodiment of the prior art.
Figure 1B:
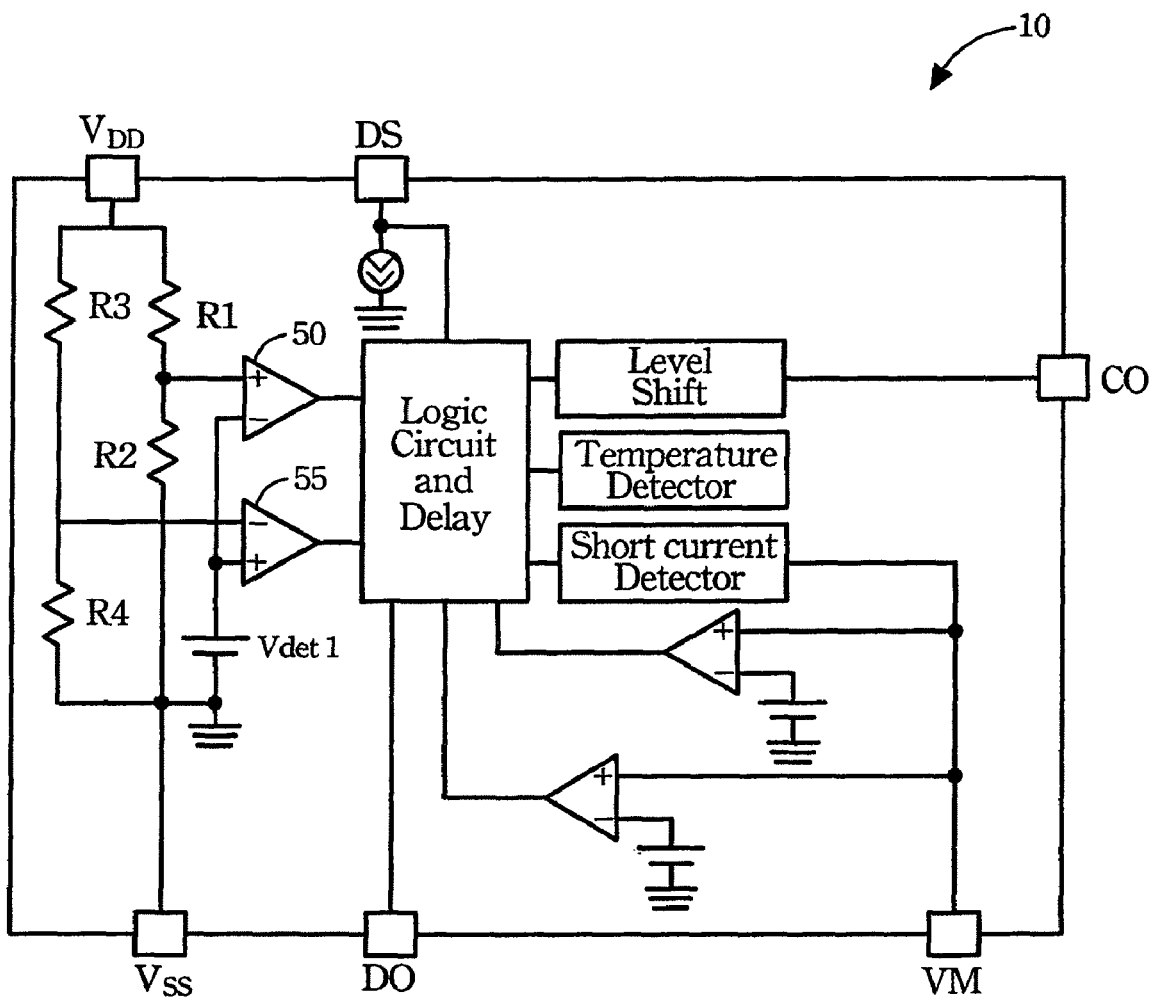
FIG. 1b shows function blocks in a battery protector according to a second preferred embodiment of the prior art.
Figure 2A:
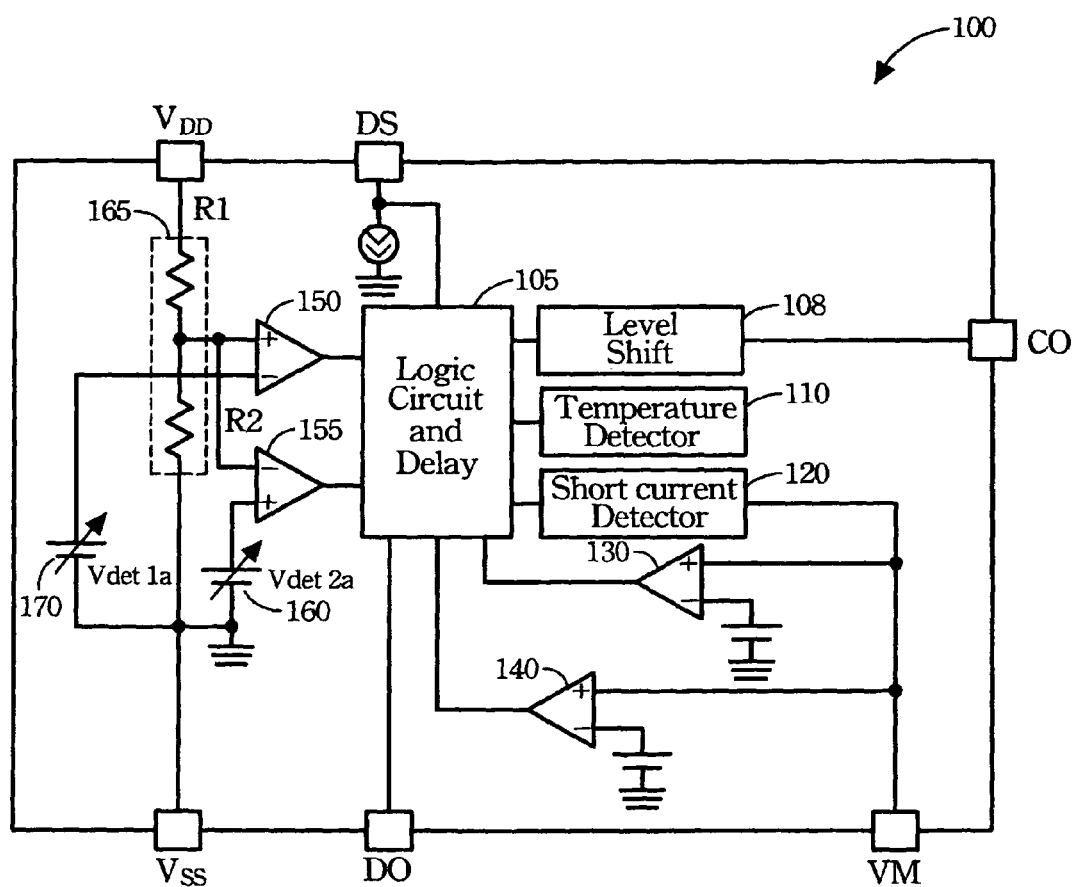
FIG. 2a shows function blocks in a battery protector according to a first preferred embodiment of the present invention.
Figure 2B:
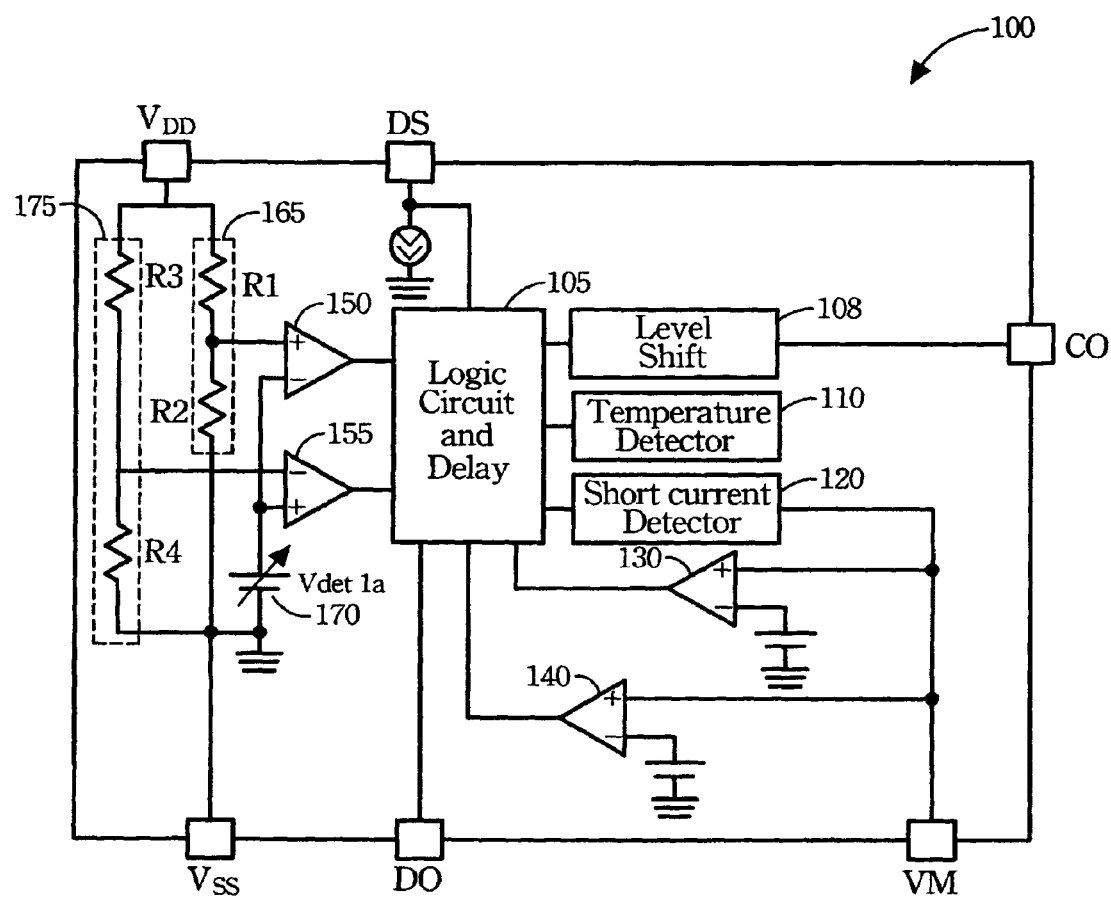
FIG. 2b shows function blocks in a battery protector according to a second preferred embodiment of the present invention.

FIGS. 2a, 2b show function blocks of a smart battery protector 100 with battery impedance compensation therein according to a first preferred embodiment and a second preferred embodiment of the present invention. In FIG. 2a, there are two reference signal adjustable generators 160, 170 in the battery protector 100. In FIG. 2b, there is only one reference signal adjustable generators 170 in the battery protector 100. In both figures, the smart battery protector 100 comprises a logic circuit and delay module 105, voltage level shift circuit 108, temperature detector 110, short current detector 120, charge over-current comparator 130, discharge over-current comparator 140, over-charge comparator 150, over-discharge comparator 155 and one voltage divider 165 or two voltage dividers 165, 175.

All of the voltage level shift circuit 108, temperature detector 110, short current detector 120, charge-over-current comparator 130, discharge-over-current comparator 140, over-charge comparator 150, and over-discharge comparator 155 have their output terminals or other terminals connected to the logic circuit and delay module 105 so that the logic circuit and delay module 105 can generate signals to appropriately respond to the input signals. For example, the short current detector 120 is to detect the occurrence of the short current and then turned off output of the battery if it indeed occurs. The discharge over-current comparator 140 is to detect occurrence of the over-current during a discharging phase. When the input signal over a reference voltage of the discharge over-current comparator 140 for a predetermined delay time to filter noise, the logic circuit and delay module 105 will pull down the pin DO so as to turn off the external NMOS FET1 during a discharging phase. The charge over-current comparator 130 is to detect occurrence of the over-current during charging phase. When the input signal is higher than the charge over-current comparator 130 for a predetermined delay time to filter noise, the logic circuit and delay module 105 will pull down the pin CO so as to turn off the external NMOS FET2.

On the other hand, the overcharge comparator 150 will make the logic circuit and delay module 105 to turn off the FET2 as an event of overcharge occurs. The over-discharge comparator 155 will make the logic circuit and delay module 105 to turn off the FET1 as an event of over-discharge occurs.

In FIG. 2a, the reference signal adjustable generator 170 provides a reference signal $V_{det1a}$ to the negative terminal of the overcharge comparator 150 and the reference signal adjustable generator 160 provides a reference signal $V_{det2a}$ to the positive terminal of the over-discharge comparator 155. The input signal of the overcharge 150 is fed through the positive terminal of the overcharge comparator 155 and the input signal of the over-discharge comparator 150 is fed through the negative terminal. Both of the above input signals are the voltage across the resistor R2 of the first voltage divider 165, which is composed of resistors R1 and R2 in series connected in between pin $V_{DD}$ and pin $V_{SS}$. The pins $V_{DD}$ and $V_{SS}$ are connected to the positive electrode and negative electrode of the battery, respectively.

As the input signal, the voltage over the resistor R2, is larger than the reference voltage $V_{det1a}$, a positive voltage will output to the logic circuit and delay module 105. Accordingly, the logic circuit and delay module 105 will then turn off the external FET2 by pulling down the voltage of pin CO. As the input signal, the voltage over the resistor R2, is lower than the reference voltage $V_{det2a}$, an another positive voltage will output to the logic circuit and delay module 105 to turn off the external FET1 by pulling down the voltage of pin DO.

The reference signal adjustable generator is shown in FIG. 3a. The operation amplifier OP170 with a negative feed-back resistor R8 connected in between the output terminal and the negative terminal of the OP170. The negative terminal of the OP170 is fed by the signal $V_{vm}$ of the pin VM through the resistor R7 and the positive terminal of the OP170 are fed by the signal $V_{det1}$ through the resistor R6. The positive terminal of the OP170 is also connected with another resistor R5 to ground. As the resistance of the resistors R5, R6, R7, R8 are appropriate selected and small significantly than the input impedance of the OP170, The output terminal of the OP170 will output an adjustable reference signal Vdet1a varied with the voltage $V_{vm}$. In the situation, the predetermined voltage $V_{det1}$ fed into the positive terminal is equal to $V_{det1}*R5/(R5+R6)$. For a case of K=2, choosing the resistance of above resistors to be equal to R, the output voltage can approach the aim of obtaining $V_{det1a}$ with battery impedance compensation.

Similarly, the reference signal adjustable generator 160 is shown in FIG. 3b. The circuit 160 is similar to the circuit 170 with the same resistors, operation amplifier OP and connected relationship except the input signal $V_{det1}$ is replaced by $V_{det2}$, a second predetermined voltage.

In another preferred embodiment, please refer to FIG. 2b. The protector 100 has only one reference signal adjustable generator 170. Due to the fact that the overcharge phenomena and the over-discharge phenomena will not occur simultaneously, it thus the adjustable reference voltage $V_{det1a}$ to be set the same as the $V_{det2a}$ can be approached. For instance, in the second preferred embodiment, the signal $V_{det1a}$ is provided as a reference signal of the negative terminal of overcharge comparator 150 and of the positive terminal of the over-discharge comparator 155. Typically, the battery internal threshold $V_{det1}$ for the overcharge comparator 150 is about 4.2V for one battery one cell and the battery internal threshold Vdet2 for over-discharge comparator 155 is about 2.4V for one battery one cell. Hence, an exemplary of the resistors R1, R2, R3, and R4 are 2.5 MΩ, 1 MΩ, 1 MΩ, and 1 MΩ, respectively can approach the aim of using single signal Vdet1a.

According to the present invention, the smart battery protector can save the total charge time in CC-CV (constant current-constant voltage) mode. Please compare FIG. 4a and FIG. 4b. In FIG. 4a, the charger is controlled by the conventional battery protector 100. At begin, the constant current (CC) for charging the battery is $I_A$ till the terminal voltage of the battery approaches via curve 190 to a target point p such as 80% of the predetermined voltage $V_{det1}$. and then turned to CV mode, the charge current is gradually decreased, which corresponds to the curve 200. It spends total charge time TC.

FIG. 4b shows the battery voltage according to the present invention. At begin, a constant charge current $I_A$ is used corresponding to the curve 191 is used to charge the battery till the terminal voltage of the battery approaches to the target point p', such as 85% of the predetermined voltage Vdet1a, and then the current is decreased gradually corresponding to the curve 201. Since $V_{det1a} > V_{det1}$ thus the target voltage p' for charging the battery is higher than the target voltage p. Thus the CC phase according to the present invention is longer than the prior art and the CV phase according to the present invention is significantly shorter than the prior art. The total charging time is $T_C$-t1. FIG. 4c showing the curves of the prior art, FIG. 4a overlay the curves according to the present invention.

Figure 5C:
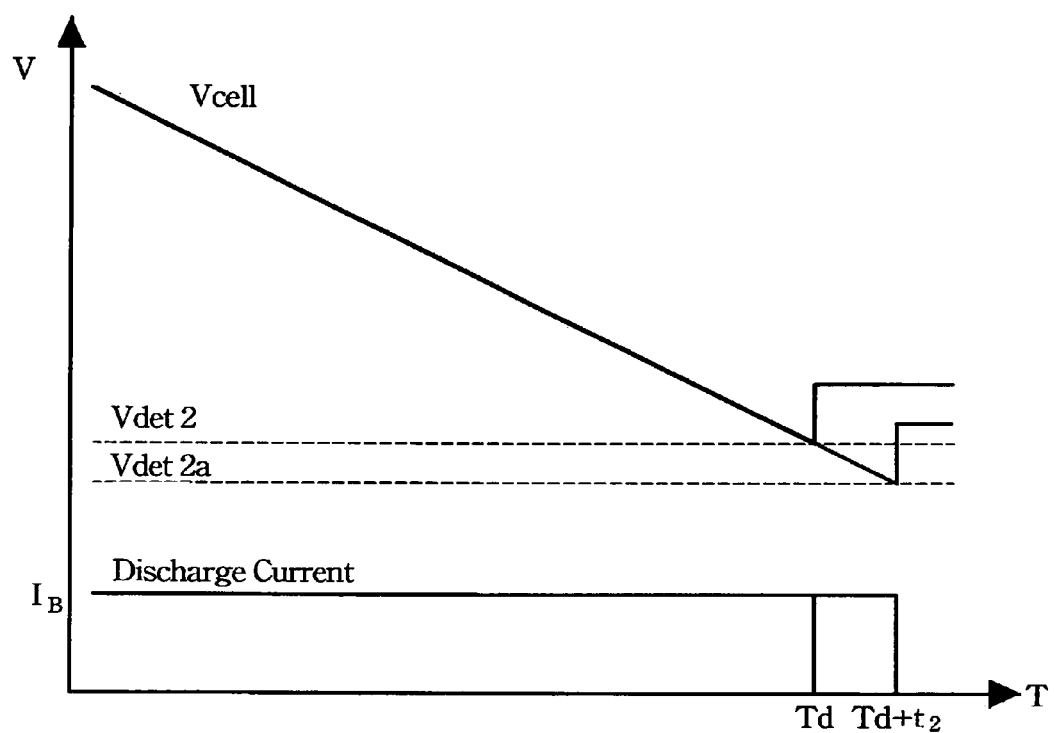
FIG. 5c shows the discharging curves according to prior art and the present invention.

The battery protector can also gain the benefits during discharge phase. FIG. 5a shows the discharge is controlled by the conventional battery protector 100 by constant discharge current $I_B$, showing the voltage vs. discharge-time curve 210 according to the prior art. The discharge will be terminated due to the internal battery impedance while the detected battery voltage $V_{cell}$ is lower than second internal threshold $V_{det2}$. However, the battery can still have some charges to provide. By contrast, under control of the battery protector 100 in accordance with the present invention, the battery can prolong the discharging time t2 since the battery is not terminate at $V_{cell} = V_{det2}$ but $V_{cell} = V_{det2a}$, as is sown in curve 220 in FIG. 5b. FIG. 5c shows the curve 210 is put together with the curve 220.

The benefits of the present invention are:

(1) In charging phase with the same charging condition, the smart battery protector with battery impedance compensation can save the charge time.

(2) In discharging phase, the smart battery protector with battery impedance compensation can provide more capacity to the load, i.e. increase the discharge time.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A battery protector with internal impedance compensation, said battery protector comprising:

a logic circuit and delay module;

an overcharge comparator having a negative terminal connected with a first reference signal and a positive terminal connected with a first detected signal, said overcharge comparator then outputting a first output signal to said logic circuit and delay module for generating a first response signal to turn off a first switch while said first detected signal is higher than said first reference signal;

an over-discharge comparator having a positive terminal connected with a second reference signal and a negative terminal connected with said first detected signal, said over-discharge comparator then outputting a second output signal to said logic circuit and delay module for generating a second response signal to turn off a second switch while said first detected signal is lower than said second reference signal;

wherein said first reference signal is generated by a first reference signal adjustable generator having a first operational amplifier, using a voltage $V_{VM}$ on a pin VM of the battery protector and a first internal threshold signal as two input signals, and said first internal threshold signal is fed through a first voltage divider to a positive input terminal of said first operation amplifier, said first reference signal being outputted varied with the internal impedance of a battery to be protected;

wherein said second reference signal is generated by a second reference signal adjustable generator having a second operational amplifier using said voltage $V_{VM}$ and a second internal threshold signal as two input signals and said second internal threshold signal is fed through a second voltage divider to a positive input terminal of said second operational amplifier, said second reference signal being outputted varied with the internal impedance of the battery.

2. The battery protector according to the claim 1, wherein said first detected signal is a partial voltage of a voltage divider which is connected between a pin $V_{DD}$ and a pin $V_{SS}$ of the battery protector.

3. The battery protector according to the claim 1, further comprising a first feedback resistor is connected in between an output terminal and a negative terminal of said first operational amplifier and a second feedback resistor is connected in between an output terminal and a negative terminal of said second operational amplifier.

4. The battery protector according to the claim 3, further comprising a first input resistor as an external input resistance of the negative terminal of said first operational amplifier and a second input resistor as an external input resistance of the negative terminal of said second operational amplifier.

5. The battery protector according to the claim 3, wherein said first voltage divider is predetermined according to a ratio of the internal resistance of the battery over a total internal resistances of the first switch and the second switch.

6. The battery protector according to the claim 3, wherein said second voltage divider is predetermined according to a ratio of the internal resistance of the battery over a total internal resistances of the first switch and the second switch.

7. A battery protector with internal impedance compensation, said battery protector comprising:

a logic circuit and delay module;

an overcharge comparator having a positive terminal connected with a first detected signal and a negative terminal connected with a first reference signal, said overcharge comparator then outputting a first output signal to said logic circuit and delay module to turn off a first switch while said first detected signal is higher than said first reference signal;

an over-discharge comparator having a positive terminal connected with a first reference signal and a negative terminal connected with a second detected signal, said over-discharge comparator then outputting a second output signal to said logic circuit and delay module to turn off a second switch while said second detected signal is lower than said first reference signal;

wherein said first reference signal is generated by a first reference signal adjustable generator having an operational amplifier using a voltage $V_{VM}$ on a pin VM of the battery protector and a first internal threshold signal as two input signals, and said first internal threshold signal is fed through a voltage divider to a positive input terminal of said operation amplifier, said first reference signal being outputting varied with the internal impedance of a battery to be protected.

8. The battery protector according to the claim 7, wherein said first detected signal is a partial voltage of a first voltage divider which is connected between a pin VDD and a pin VSS of the battery protector.

9. The battery protector according to the claim 7, wherein said second detected signal is a partial voltage of a second voltage divider which is connected between a pin VDD and a pin VSS of the battery protector.

10. The battery protector according to the claim 7, further comprising a feedback resistor is connected in between an output terminal and a negative terminal of said operational amplifier.

11. The battery protector according to the claim 10, further comprising an input resistor as an external input resistance of the negative terminal of said operational amplifier.

12. The battery protector according to the claim 10, wherein said voltage divider is predetermined according to a ratio of the internal resistance of the battery over a total internal resistances of the first switch and the second switch.

* * * * *